May 5, 1942. W. HAMILTON 2,282,223
LOOM
Filed May 28, 1940 12 Sheets-Sheet 5

WALLACE HAMILTON.
INVENTOR.
BY Ely & Pattison
ATTORNEYS.

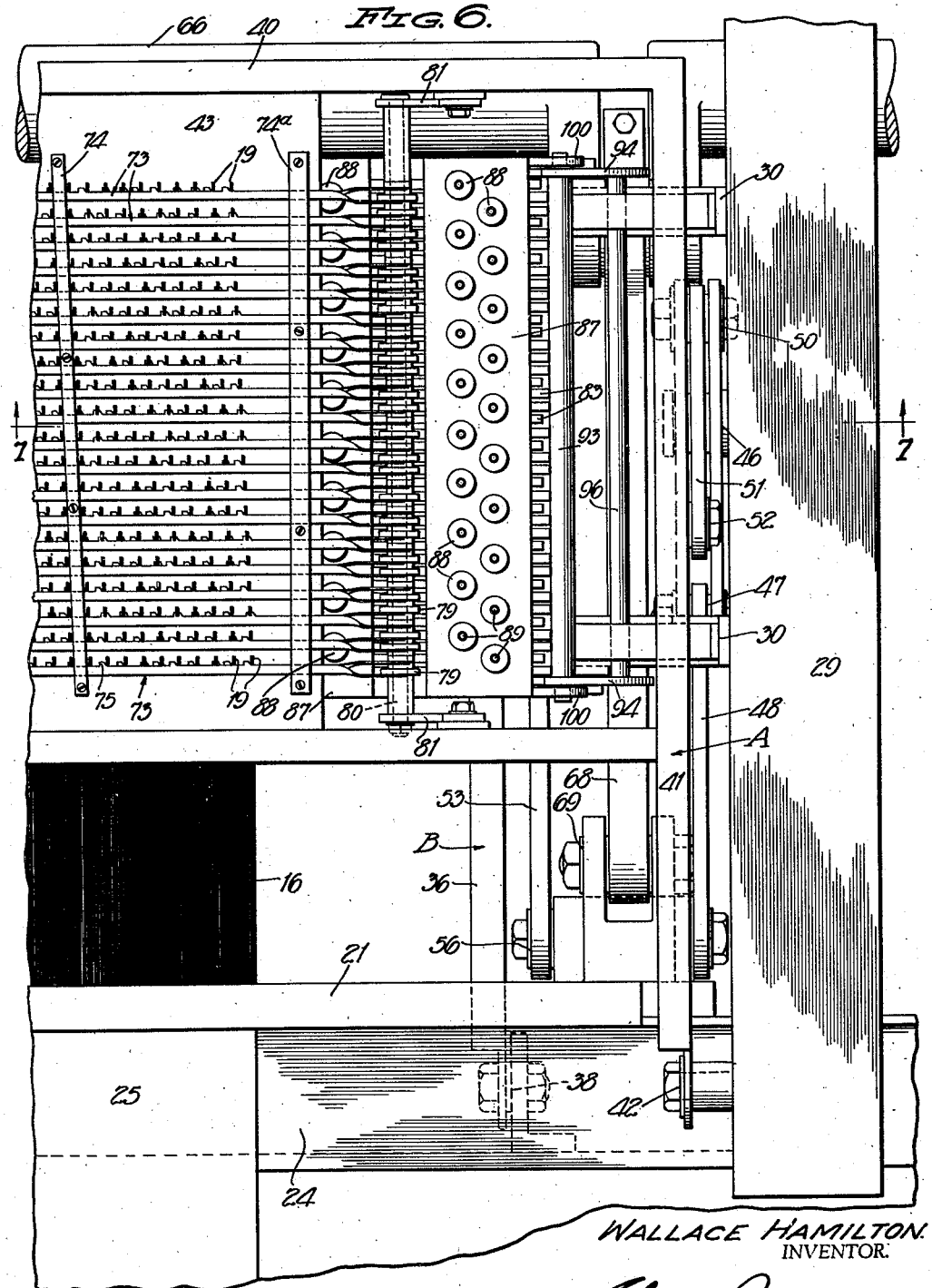

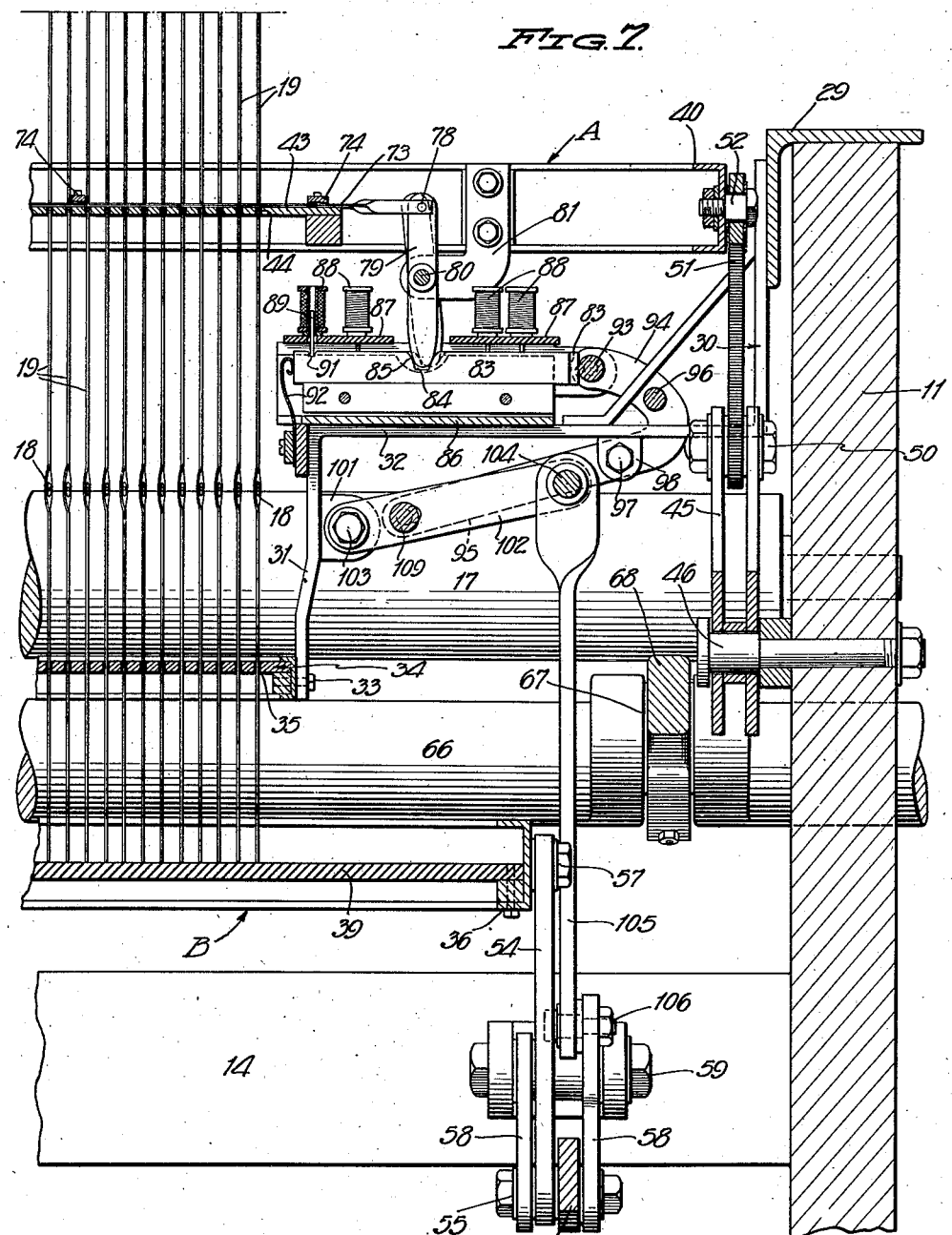

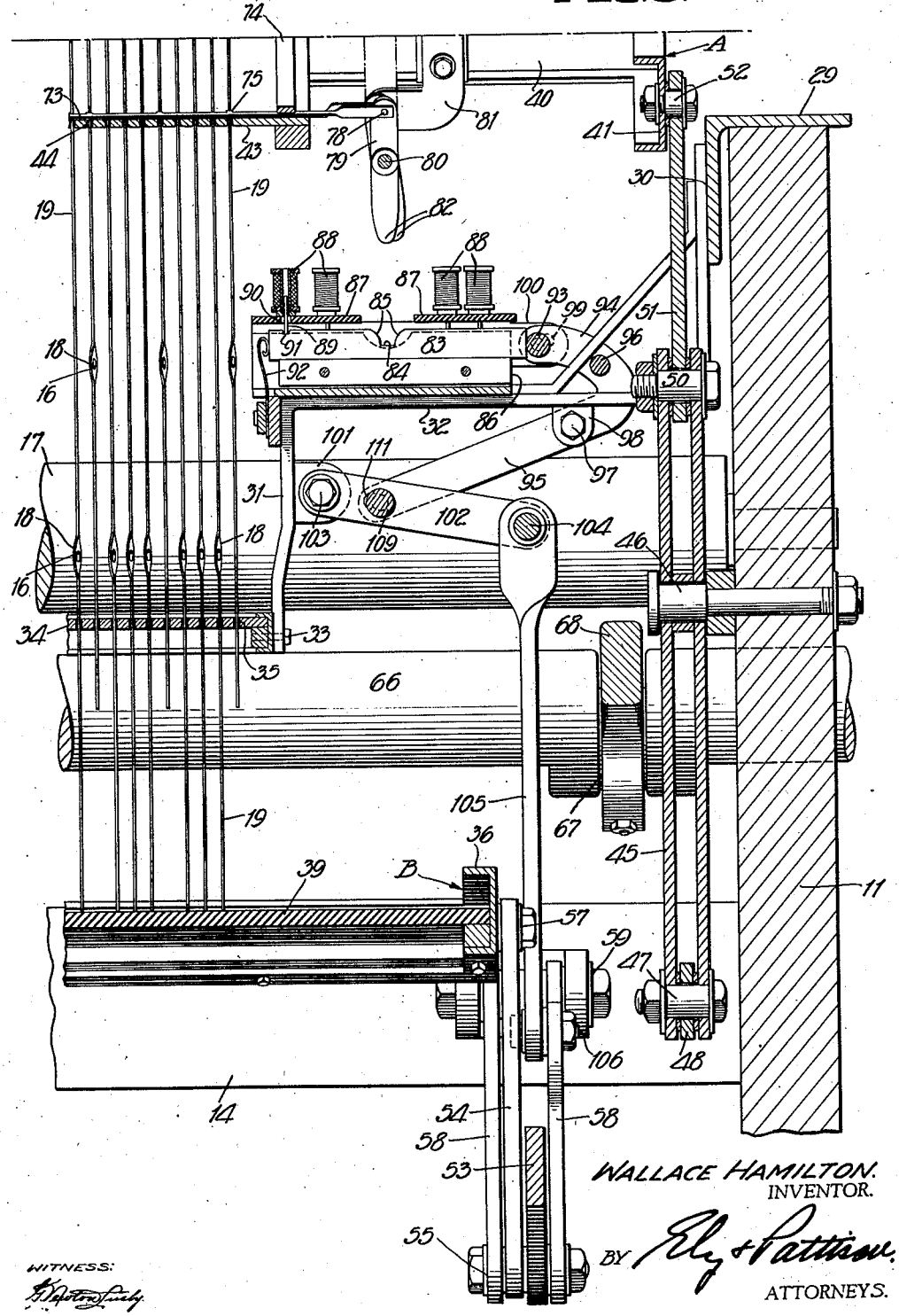

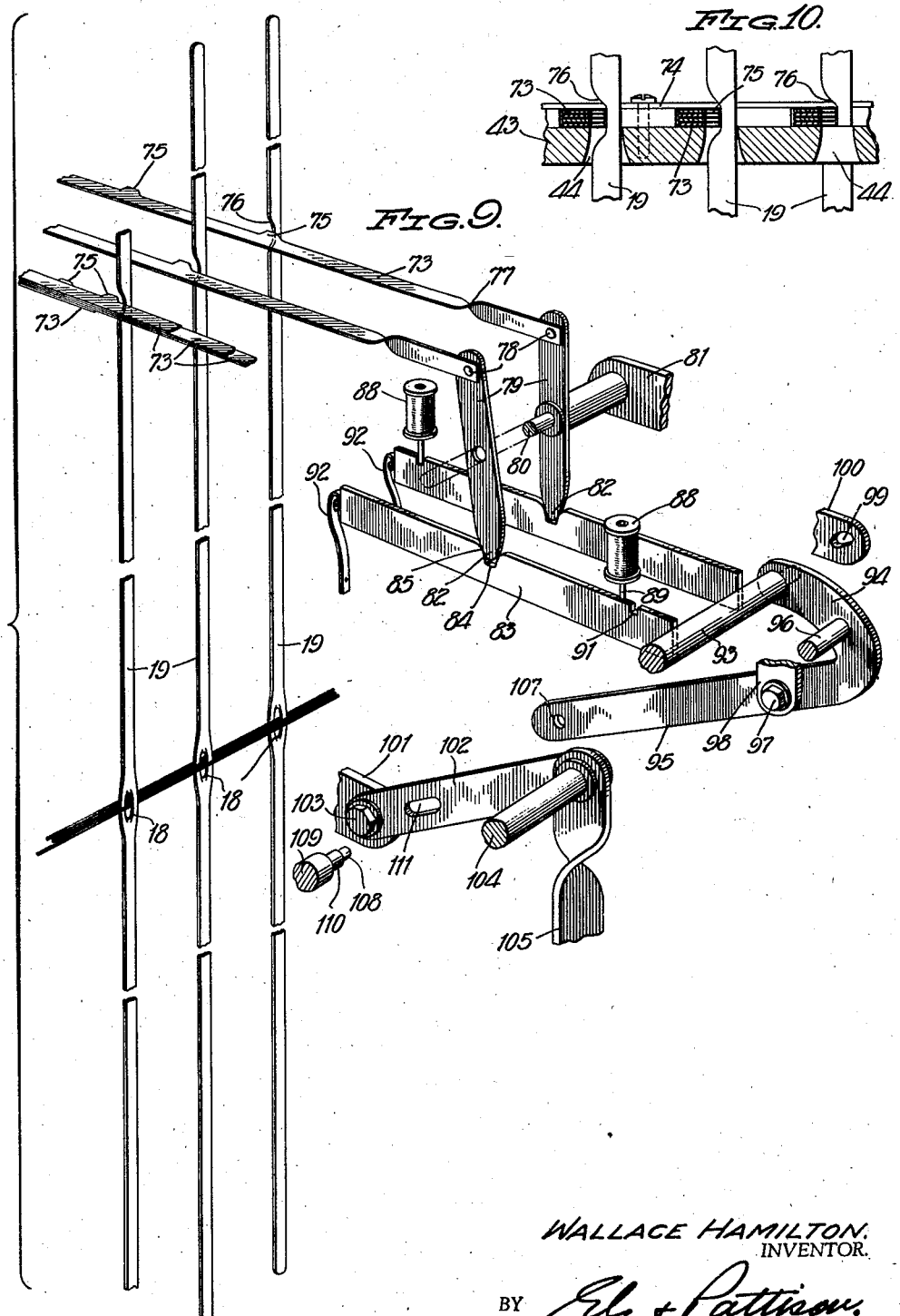

WALLACE HAMILTON
INVENTOR.

May 5, 1942.   W. HAMILTON   2,282,223
LOOM
Filed May 28, 1940   12 Sheets-Sheet 11

WALLACE HAMILTON.
INVENTOR.

BY Ely & Pattison
ATTORNEYS.

May 5, 1942. W. HAMILTON 2,282,223
LOOM
Filed May 28, 1940 12 Sheets-Sheet 12
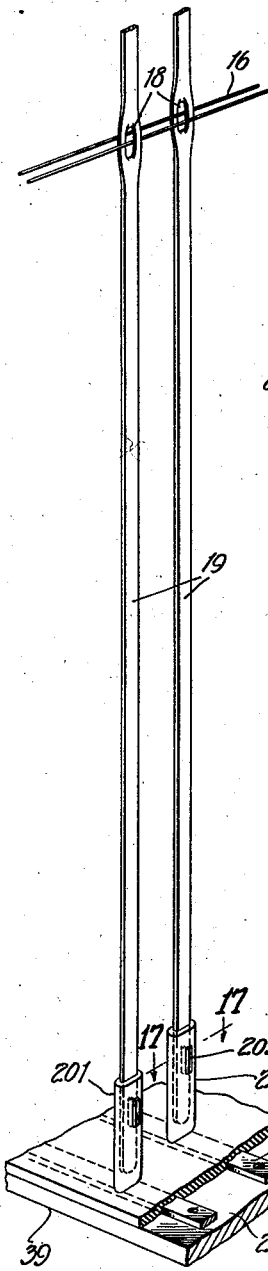
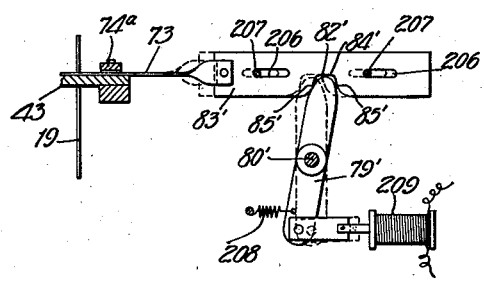
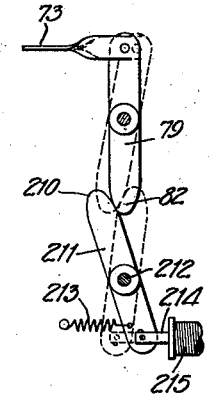
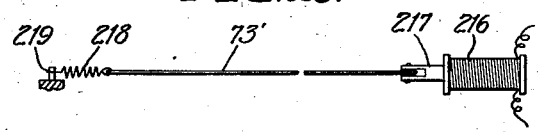
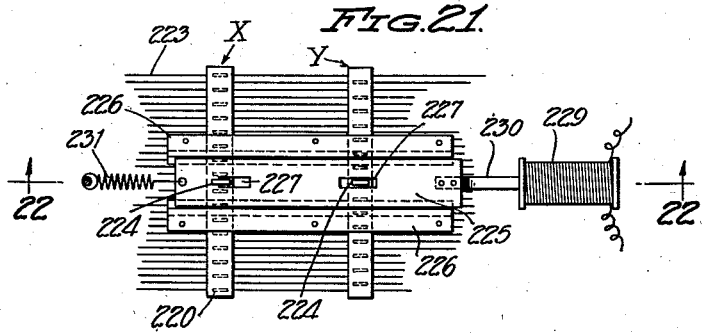
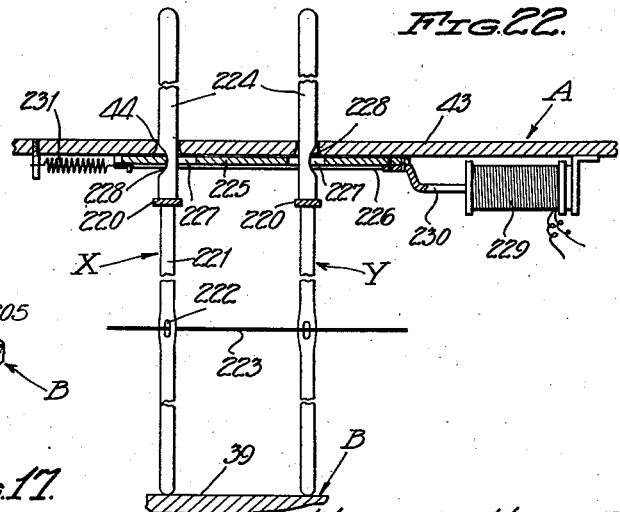
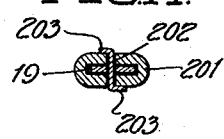
WALLACE HAMILTON.
INVENTOR.
BY Ely & Pattison,
ATTORNEYS.

Patented May 5, 1942

2,282,223

UNITED STATES PATENT OFFICE 2,282,223

LOOM

Wallace Hamilton, Plainfield, N. J.

Application May 28, 1940, Serial No. 337,592

27 Claims. (Cl. 139—55)

This invention relates to improvements in looms and more particularly to that type of loom for the weaving of cloth fabric.

Some of the outstanding objects of the invention are to reduce the height of the loom to conserve room space, by elimination of the conventional overhead harness mechanism; to reduce the noise of the running of the loom which is at present occasioned by the harness mechanism and various cams and other parts employed for actuating the harness mechanism and head motion.

Another important feature of the invention resides in a novel head motion for looms in which the heddles which form the shed of the warp threads move simultaneously up and down to permit of a more rapid shedding movement of the heddles and consequently permits safe running of the loom at a greater speed.

Another feature of the invention is to provide a loom which permits jacquard type weaving at a speed of a dobby loom, and which gives a much greater flexibility of pattern control while at the same time eliminating excessive height, cards, and other space consuming parts with which the present conventional loom is associated.

Whereas several of the outstanding features of the invention have been set forth above, many other important and novel features of the invention will be hereinafter explained in the following specification and will be found clearly illustrated in the accompanying drawings, in which:

Figure 6 is an enlarged top plan view of the right end of the loom with the hood casing removed and the head motion mechanism in closed position.

Figure 7 is a detail vertical longitudinal sectional view on the line 7—7 of Figure 6.

Figure 8 is a view similar to Figure 7, but showing the head motion mechanism in open shed forming position.

Figure 9 is a detail perspective view with parts in section of the heddle latch mechanism.

Figure 10 is an enlarged detail vertical transverse sectional view through several heddles and their related latch bars.

Figure 16 is detail sectional perspective view illustrating the manner in which the heddles may be weighted.

Figure 17 is a detail horizontal sectional view of the line 17—17 of Figure 16.

Figure 18 is a detail sectional elevational view of a modified form of heddle latch bar actuating mechanism, the parts being shown in unlatching position in full lines and in latching position in dotted lines.

Figure 19 is a detail sectional elevational view of a further modified form of heddle latch bar actuating means, the parts being shown in latching position in full lines and in unlatching position in dotted lines.

Figure 20 is a side elevational view of a further modified form of latch bar actuating mechanism.

Figure 21 is a detail top plan view of an auxiliary heddle actuating means for forming a selvage edge upon the cloth to be woven.

Figure 22 is a vertical longitudinal sectional view on the line 22—22 of Figure 21.

Figure 1:
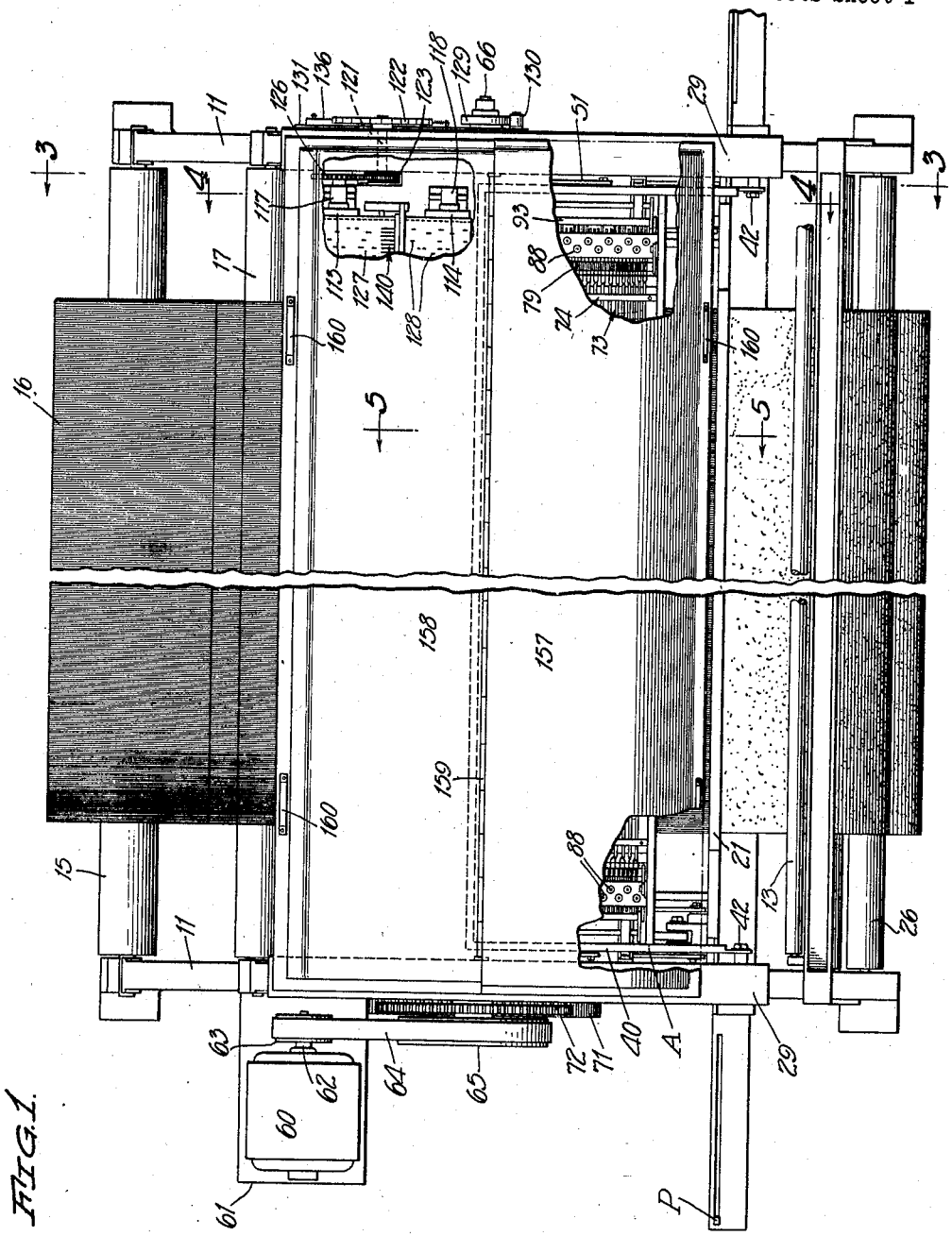
Figure 1 is a top plan view of my improved loom with parts broken away.

Referring to the drawings by reference characters, the numeral 10 designates a loom frame which includes a pair of spaced opposed upstanding end frame sections 11—11 which may be joined together by various longitudinal bracing members among which I have shown as an angle rail 12, and a U-channel rail 14 just rearwardly of the central portion of the end frame sections, and which serve other purposes as will be hereinafter explained. A roller 13 is journaled in the frame sections 11—11 adjacent the front thereof.

Mounted low at the rear of the end frame sections 11—11 is the usual warp beam 15 on which the warp ends 16 are wound. The warp ends extend upwardly from the warp beam 15 and forwardly over the whip roll 17 which is disposed on a substantially horizontal plane with the roll 13. The warp ends 16 respectively pass through the eyes 18 of heddles 19, which by reason of the novel head motion presently to be described, forms a shed 20, the warp ends at the shed passing through the dents of a reed 21 which is mounted at the top of the lay 22, which is pivoted at its lower end to the loom frame at 23. The lay sword also carries the shuttle race 24 in the usual manner, disposed forward of the reed 21 and along which the shuttle (not shown) travels back and forth to lay the filling threads within the shed 20 and which is actuated by picker sticks P at the ends of the loom. The reed 21 reciprocates forward and rearward in timed relation to the various other mechanisms of the loom by reason of oscillatory pivotal movement imparted to the lay sword 22, and the forward movement of the reed beats or pushes the filling threads against the edge of the previously woven filling thread. The cloth 25 passes forwardly under the roll 13, thence downwardly over the usual guide rolls represented by 26 and 27 and is finally wound upon a cloth beam 28 journaled in the end frames 11—11.

Extending forwardly and rearwardly along the tops of the end frame sections 11—11 are angle bars 29 which have their horizontal flanges welded, bolted or otherwise fastened to the end frame sections while their vertical flanges depend inwardly along the inner sides of the frame sections 11. Fastened to the depending flanges of the angle bars 29 and supported by the depending flange of each angle rail is a pair of spaced substantially Z-shaped hanger brackets 30. Thus there are pairs of opposed alined brackets 30 at the ends of the loom frame and these four brackets extend inwardly with their free end portions 31 extending downwardly and with their intermediate portions 32 disposed on a horizontal plane. The depending end portions 31 of the hanger brackets are fixedly connected as at 33 to the ends of a rectangular shaped heddle guide plate 34 which has longitudinal rows of spaced slots 35 therein through which the respective heddles 19 freely slide. Whereas I do not wish to limit the number of longitudinal rows of heddles 19, I have illustrated in the drawings, twenty rows of heddles, and the slots 35 in the guide plate 34 are staggered relative to each other so as to correspondingly stagger the rows of heddles. By referring to Figure 6 of the drawings, it will be seen that the end heddles of the twenty longitudinal rows are successively stepped to the left so as to be offset relative to each other and these twenty end heddles 19 respectively have the twenty warp threads 16 passing through the eyes 18 thereof. This allows the warp ends a straight path to the reed and thus eliminates the possibility of them being chafed by adjacent heddles. The end heddle of the front longitudinal row receives the first end warp thread and the end heddle at the rear receives the twentieth warp thread, thus the next adjacent heddle on the front row receives the twenty-first warp thread and the next adjacent heddle of the rear row receives the fortieth warp thread, and so on along the length of the remaining rows of heddles. Thus the warp ends are disposed in close spaced relation for free up and down movement which is essential for the formation of the shed 20.

The head motion for selectively raising the desired heddles and simultaneously lowering the remaining heddles includes an upper pivoted member A and a lower pivoted member B. The member A is disposed directly above the member B and the two members are respectively disposed at opposite sides of the guide plate 34 and the ends thereof extend slightly beyond the plane of the ends of the guide plate. In view of the fact that the lower member B normally supports all of the heddles 19, the same will be described in advance of the member A, which latter member functions to lift those heddles which are selected to move upward during the operation of the head motion in a manner to be specifically pointed out hereinafter.

The member B comprises a rectangular channel frame body 36, the ends of which are provided with forwardly extending arms 37 which are pivoted to the angle brace rail 12 as at 38. The frame body 36 has a flat imperforate panel 39 fixedly mounted therein. The panel 39 may be of linoleum, rubber, or other sound deadening material having a flat surface. Normally, all of the heddles 19 have their lower ends resting upon the upper flat surface of the panel 39, and those heddles which are not selected to be lifted by the member A, remain seated upon the panel 39 and move with the member B during operation of the head motion by the actuating mechanism presently to be described.

The member A comprises a rectangular channel frame body 40, the ends of which are provided with forwardly extending arms 41 which are pivoted to the forward portions of the rails 29 as at 42. The frame body 40 has a flat metal panel 43 fixedly mounted therein, and which has staggered rows of slots 44 therein corresponding to the rows of slots 35 in the guide plate 34 and through which the upper portions of the heddles 19 freely pass.

The pivoted members A and B are operatively connected together by a series of levers and links which are disposed at the ends thereof and which serve to positively actuate the members in timed relation. In view of the fact that the operative end connections between the members A and B are identical, a description of the operative connection at one end will suffice for the construction at the opposite end. Each operative end connection between the members A and B includes a rock lever 45 pivoted intermediately to a stub shaft 46 which is fixedly secured to the adjacent end frame section 11. The lower end of the lever 45 is pivotally connected at 47 to one end of a link 48, the other end of the link being pivoted at 49 to the pivoted lay sword 22. The upper end of the rock lever 45 is pivoted as at 50 to one end of a link 51, the other end of said link being pivoted at 52 to the adjacent end of the frame body 40 of the upper heddle lifting member A. The links and levers just described serve to impart up and down pivotal movement of the member A during the back and forth pivotal movement of the lay sword and simultaneously imparts down and up pivotal movement of the member B in operative timed relation with the member A by reason of an actuating mechanism now to be described.

The actuating mechanism for the lower member B comprises a pair of levers 53 and 54 which are pivotally connected at one of their ends by a pivot pin 55. The lever 53 is longer than the lever 54 and has its other end pivoted to the lay sword 22 as at 56, and which pivot 56 is in axial alinement with the pivot 49 hereinbefore referred to. If desired, the pivots 49 and 56 may be a single pivot member and not two separate pivots. The other end of the lever 54 is pivoted at 57 to an adjacent end of the frame body 36 of the member B. Also connected to the pivot pin 55 is one end of a lever 58 while the other end of the same is pivoted at 59 to a bracket extending forwardly from the bracing rail 14. By reason of the pivoted levers 53, 54, and 58 it is apparent that as the lay sword 22 moves rearwardly, the member B will swing downwardly simultaneously with the upward movement of the member A to the positions shown in Figure 5 and as the lay sword 22 moves forward, the member B will swing upwardly and the member A downwardly to the position shown in Figures 3 and 4.

For imparting power to the various working parts of the loom, I provide an electric motor 60, which is mounted on a platform 61 at the left end of the loom adjacent the rear thereof. The driving shaft 62 of the motor has a pulley wheel 63 mounted thereon over which an endless belt 64 passes. The belt 64 also passes over a relatively large pulley wheel 65 which is fixed to a crank shaft 66 which is journaled in the end frame sections 11—11. The shaft 66 is provided with two like crank portions 67 adjacent its ends to which the rear ends of pitmans 68 are connected by wrist bearings, the front ends of the pitmans being pivotally connected to the lay swords 22 as at 69. It will thus be understood that as the shaft 66 rotates, the cranks and pitmans will impart a back and forth oscillatory movement to the lay sword 22, and the oscillatory movement of the frame imparts simultaneous pivotal movement of the heddle actuating members A and B to move the members alternately toward and away from each other.

Journaled in the end frame members 11—11 below the shaft 66 is a driven power take-off shaft 70 having a gear 71 fixed to the left end thereof and which meshes with a gear 72 fixed to the shaft 66. Power may be taken from the shaft 70 for operating other parts of the loom such as the picker stick actuating mechanism (not shown).

In order to form the shed 20 it is necessary that certain of the heddles 19 move upward with the pivoted member A while the remaining heddles drop by gravity upon the downward movement of the pivoted member B. To selectively connect the heddles to the member A, I provide a novel heddle control mechanism now to be described.

Each longitudinal row of heddles 19 is under the control of a group of four slidable latch bars, each of which is designated 73, the latch bars of each group being arranged in superposed relation. I have illustrated twenty longitudinal rows of heddles, therefore there are twenty groups of superposed latch bars, a total of eighty latch bars in all. While I have illustrated twenty rows of heddles, and four superposed latch bars to each group, I do not wish to be limited thereto. Each group of latch bars 73 rest flat upon the top face of the panel 43 of the upper pivoted member A, and the latch bars are disposed forwardly of the rows of heddles which they control. Spaced guide bars 74 are secured to the panel 43 transversely thereof and through which the groups of latch bars freely slide. Each latch bar 73 of a group is provided with a plurality of equidistantly spaced rearwardly extending teeth 75, the space between the adjacent teeth being approximately the distance between four heddles 19 in the same longitudinal row as best illustrated in Figure 6. Each tooth 75 is engageable with an adjacent heddle 19 by reason of the tooth entering a notch 76 in the front edge of the heddle 19 when the latch bar is slid to latching position. By reference to Figure 10, it will be seen that the side walls of the notches 76 are cam curved to prevent snagging of the heddles on the head member 43 or upon adjacent warp threads when the heddles are unlatched. Thus it will be understood that the teeth 75 of one latch bar are engageable with every fourth heddle of a longitudinal row, and by successively staggering the teeth 75 on a group of latch bars, all the heddles of a row are capable of being locked by their related latch bars. Therefore, if the latch bars 73 of the twenty groups can be selectively slid to latching position, it is possible to lock certain of the heddles to the upper member A for upward movement therewith, the heddles left unlatched being free to drop with the downward movement of the lower member B. A selective control and actuating mechanism for the latch bars will now be explained.

Each latch bar 73 has its own selected control and actuating mechanism, which, as illustrated in the drawings, totals eighty, therefore, for space conserving reasons, I provide forty of such mechanisms at one end of the loom and the other forty at the other end thereof. Two latch bars of each group are controlled from one end of the loom and the other two of a group from the other end thereof. It is believed that a description of one latch bar controlling and actuating mechanism will suffice for the others, although certain like parts in the respective mechanisms may be staggered to prevent interference of operation of one latch bar actuating mechanism with another.

In Figures 6 to 9 inclusive I have illustrated the latch bar control and actuating mechanism which is located at the right end of the loom and the matter now to be described will best be understood by referring to these figures. The sliding movement of each latch bar 73 controlled from the right end of the loom is toward the right from a neutral unlatched position to a latching position, and from right to left for return from latching to unlatching position, while the movement of the latch bars controlled from the left end of the loom are just the reverse. One end of each latch bar 73 extends beyond one end of the panel 43 of the member A and this extending end is provided with a ninety degree twist 77 so that the wide flat sides are vertical. The twisted end of the latch bar is pivoted at 78 to the upper blunt end of a dagger-shaped rock lever 79. Those rock levers 79 at an end of the loom are pivotally mounted upon a common pivot rod 80 which extends from front to rear and has its ends fixedly mounted in alined hanger brackets 81 which are fixed to and depend from the front and rear sides of the frame 40 of the upper pivoted member A. The lower end of the lever 79 is tapered and terminates in a reduced rounded nose 82. The actuation of each dagger-lever 79 is controlled by two relative positions of a slide bar 83 which has a notch 84 in the upper edge thereof, the side walls of the notch diverging outwardly to provide surfaces 85, one of which is engaged by the nose 82 of the lever 79 when the bar is in an extended unlatched position, and which action serves to actuate the lever 79 to move its related latch bar 73 from latching to unlatching position, and the other cam surface acts to move the dagger lever in a reverse direction to actuate the latch bar from an unlatching to a latching position. The slide bars 83 are mounted in a channel rack 86 which is supported upon the horizontal portions 32 of the pair of hanger brackets 30 and which rack extends transversely across the loom. Each slide bar is disposed in a channel of the rack and slides back and forth in a direction lengthwise of the loom. The top of the rack is bridged by two spaced flat supporting plates 87—87, the space between the supports permitting the nose ends of the dagger-levers 79 to enter the notches 84 of the respective slide bars.

Each latch bar 83 is under the control of an electric solenoid 88 which is fixedly mounted upon either of the plates 87. The solenoids 88 are mounted in double rows upon the plates 87 and are staggered so as to be disposed in alinement with the respective slide bars 83 with which they are operatively related. The sliding armature or pin 89 of each solenoid normally drops by gravity through an opening 90 in the plate 87 and enters a notch 91 in the top of the slide bar 83 for locking the slide bar against sliding movement. A leaf spring 92 constantly bears against the inner end of each slide bar 83 to urge the same outwardly to extended position. By reference to Figure 8, it will be seen that if the left end solenoid 88 is energized, the sliding armature 89 will move upwardly out of the notch 91, and the spring 92 will push the bar 83 outwardly against a rod 93, and position the notch 84 out of direct vertical alinement with the shaft 80 whereby upon downward movement of the dagger lever 79 the nose 82 thereof will strike against one of the cam walls 85 and cause the lever to turn slightly and effect an unlatching of the latch bar 74. The bars 83 unless locked in position by the armature 89 of the solenoids 88, are forced by springs 92 to bear against a combined stop and pusher rod 93 which is supported transversely of the loom by the inwardly hooked ends 94 of a pair of rock levers 95, the latter being joined by a connecting brace rod 96. The intermediate portions of the levers 95 are pivoted at 97 to ears 98 depending from the horizontal sections 32 of the brackets 30. To positively limit the movement of the rod 93 toward and away from the rack 86 in which the bars 83 are slidably mounted, the ends of the rod 93 project beyond the outer sides of the levers 95 and are reduced for reception in arcuate slots 99 provided in ears 100 extending outwardly from the ends of the rack 86. The hooked ends 94 of the levers 95 are relatively short compared to the straight main body portions of the levers, and it will be understood that if the body of the levers are pulled down, the hooked ends 94 will move inwardly, pushing away bars 83 which might have been previously extended, to their return locking position. Should the levers 95 be pushed upwardly, the hooked ends 94 will swing outwardly, whereupon any bars 83 which are unlocked by the armature pins 89 will move outwardly to extended position by reason of the springs 92. The levers 95 are actuated in timed relation to the opening and closing movements of the head motion in a manner now to be described, by operatively connecting the same to the levers 58 which form part of the actuating means for the pivoted member B of the head motion.

Formed integral with and extending outwardly from the vertical portions 31 of the brackets 30, are ears 101 to which one end of levers 102 are pivoted at 103, the other ends of the levers 102 being joined by a transveres brace rod 104 on which the upper ends of levers 105 are pivoted. The lower ends of the levers 105 are pivoted at 106 to the respective levers 58. The levers 95 are provided with alined openings 107 which receive the reduced portions 108 provided at the ends of a tie rod 109. The rod 109 also has bearing portions 110 which freely pass through elongated slots 111 in the levers 102.

From the construction hereinbefore described it will be apparent that if the solenoids 88 can be selectively energized and de-energized that various weaves of cloth may be woven, and that decorative artistic designs may be simultaneously woven into the cloth. This can be accomplished by an automatic electric pattern or jacquard pattern control mechanism now to be described.

Supported by the rail 29 at the left end of the loom rearwardly thereof is a platform 112 on which a pair of spaced sprocket drums 113—114 are rotatably supported by shafts 115—116 respectively, the latter being journaled in bearings 117—118 respectively. Hanger members 119 depend from the platform 112 which rotatably and adjustably support a driving sprocket drum 120 which is fixed to a shaft 121. The outer end of the shaft 121 extends beyond the outer side of the right end frame section 11 and has a ratchet wheel 122 fixed thereto, while a gear 123 is fixed to the shaft 121 at the inner side of the end frame section and meshes with a larger intermediate gear 124 fixed to a stub shaft 125, the intermediate gear also meshing with a gear 126 fixed to the shaft 115. An endless pattern control belt 127 passes about the sprocket drums 114, 115, and 120, the belt being provided with slots to receive the teeth of the sprocket drums. The pattern belt 127 is constructed of a flexible dielectric material, such as paper, and is also provided with longitudinal rows of slots 128 similar to that employed in automatic player piano rolls. The maximum longitudinal rows of slots 128 on the belt should correspond to the number of solenoids, which in this instance totals eighty, and although no systematic arrangement of slots has been illustrated in the drawings, it will be understood that the slots may be predeterminedly cut or punched in the belt to selectively effect energization of the solenoids 88 by the closing of individual electric control circuits in which the solenoids are respectively arranged in a manner presently to be described.

Figure 2:
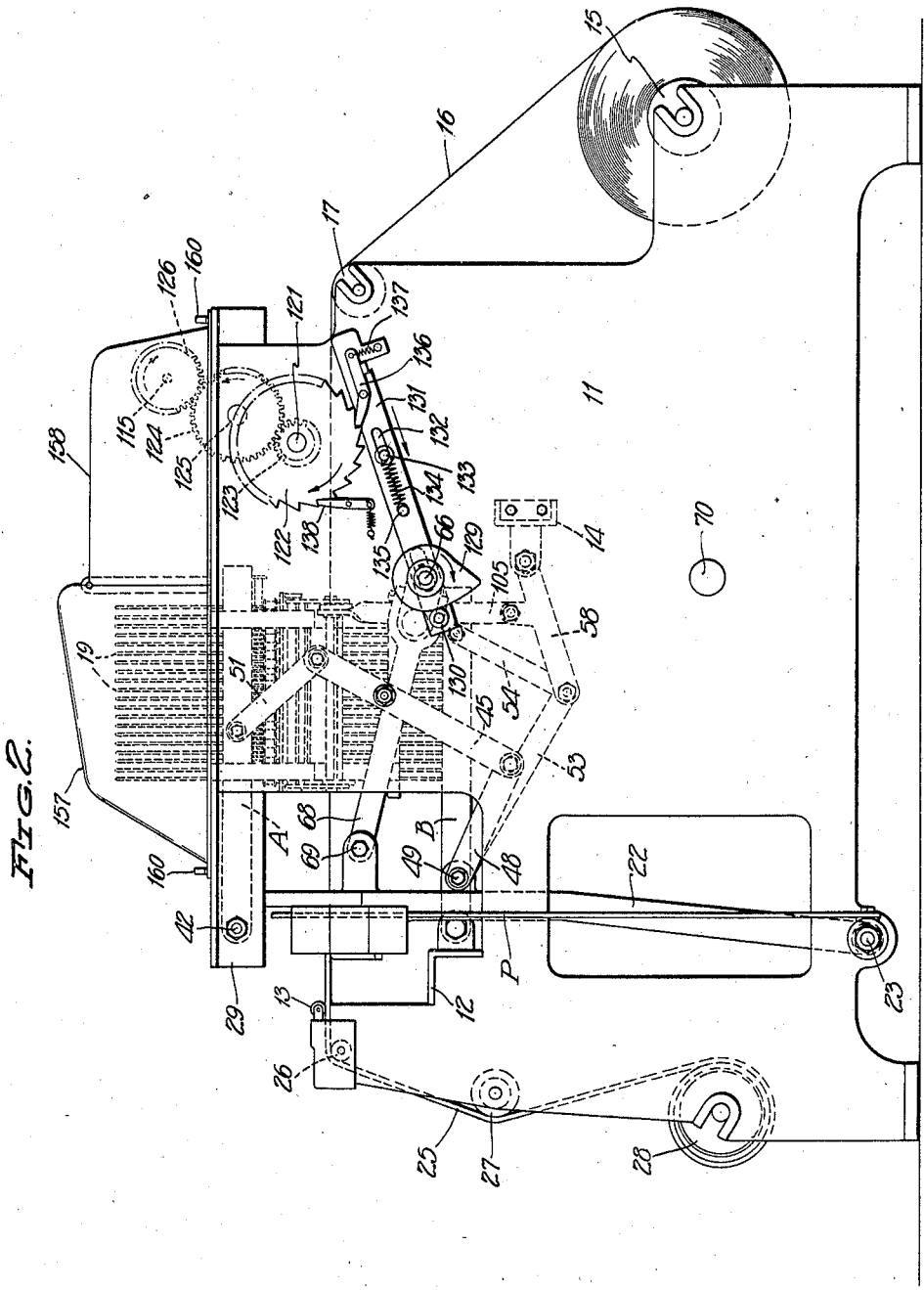
Figure 2 is an end elevational view.
Figure 4:
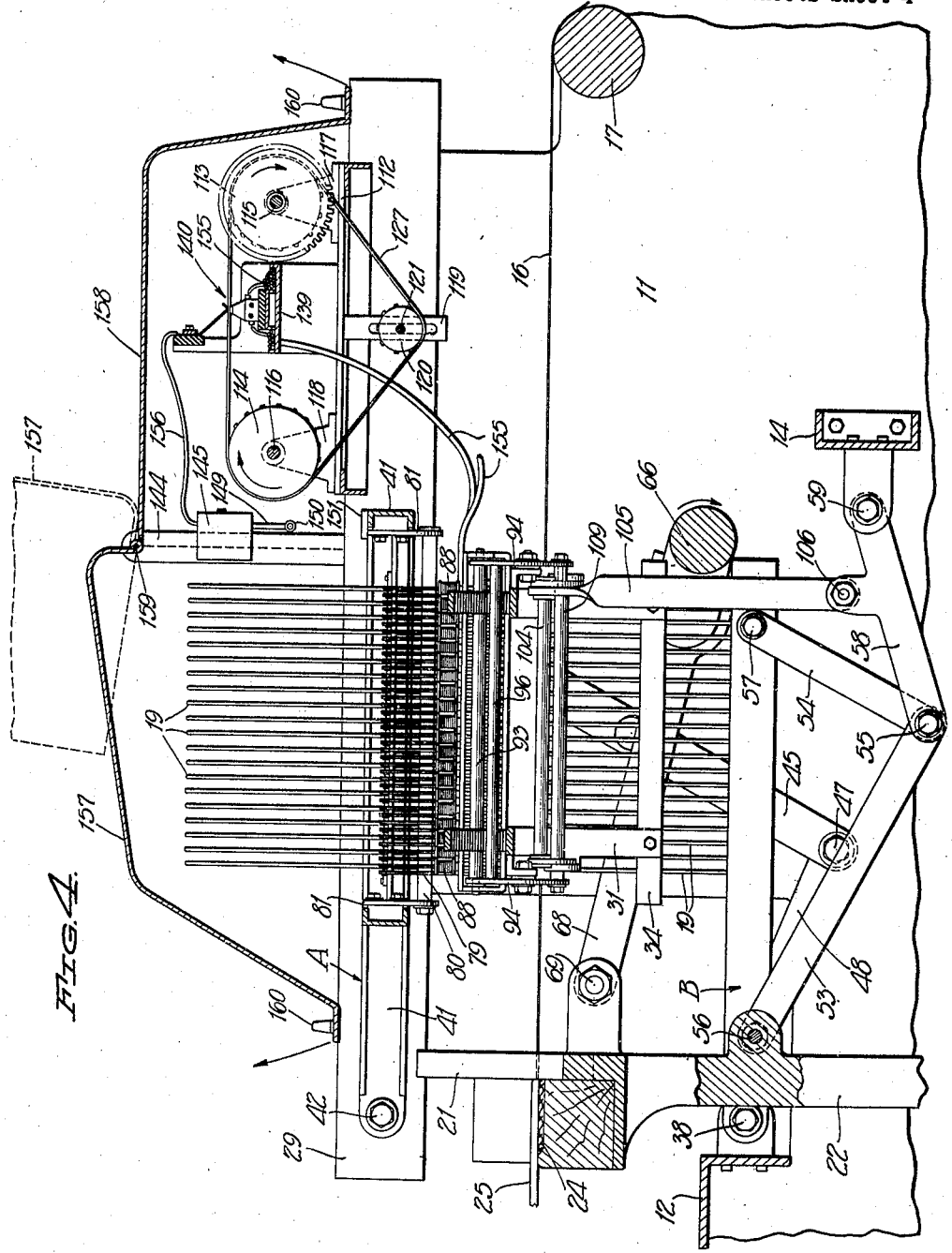
Figure 4 is a vertical transverse sectional view substantially on the line 4—4 of Figure 1.

The pattern belt 127 is intermittently moved in the direction of the arrows shown in Figure 4 by operatively connecting the ratchet wheel 122 with the head motion driving crank shaft 66 as best illustrated in Figure 2. The right end of the shaft 66 has an abruptly peaked cam 129 fixed thereto which constantly bears against a roller 130 mounted on a slide bar 131. The slide bar 131 is mounted on the outer side of the right end frame section 11 and has a slot 132 therein through which a guide pin 133 extends, the pin being fixed to the end frame section 11. One end of a contractile spring 134 is fixed to the pin 133 while its other end is attached to an anchor pin 135 which is mounted on the slide bar 131. The spring 134 is always under tension to hold the roller 130 against the cam 129. Pivoted to the slide bar 131 is a ratchet pawl 136 which is held in engagement with the periphery of the ratchet wheel 122 by a spring 137. A spring actuated latch pawl 138 is pivoted to the frame section 11 and engages the periphery of the ratchet wheel 122 to prevent retrograde movement thereof. Thus it will be understood that upon each complete revolution of the shaft 66, the high spot or peak of the cam 129 will impart a sliding movement to the bar 131, causing the pawl 136 to turn the ratchet wheel 122 a predetermined distance, and which rotary movement is imparted to the shaft 115 of the driving sprocket drum 113 through the medium of the gears 123, 124, and 126, and which movement of the drum 113 moves the pattern belt 127 a predetermined distance. The spring 134 returns the slide bar 131 after the peak of the cam 129 leaves the roller 130, so as to position the ratchet actuating pawl for another ratchet operation.

Figure 11:
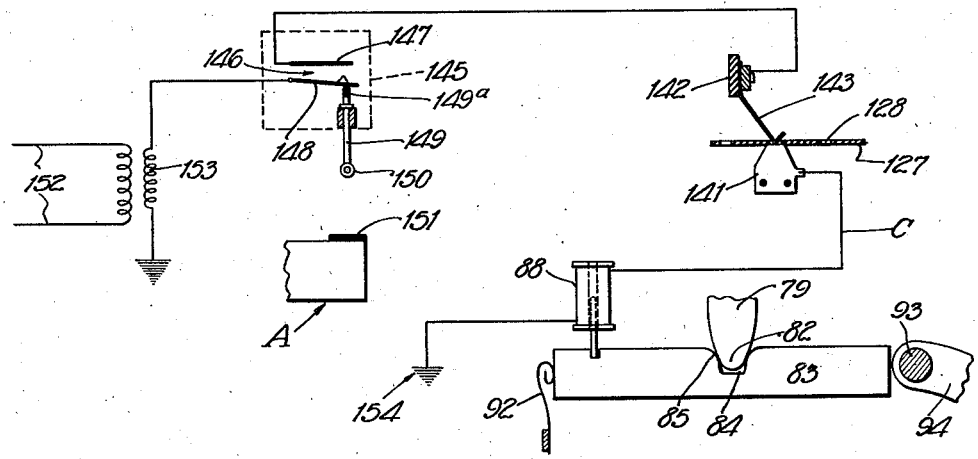
Figure 11 is a detail diagrammatic view of the electrical heddle selecting circuit in which a movable endless strip is employed for determining the shedding of the warp threads.

Mounted on a support 139 which is interposed between the drums 113 and 114 is an electrical circuit selecting mechanism 140 which cooperates with the endless pattern belt 127 to set the electric circuit C (Figure 11) for operation, the circuit C having branches in which the solenoids 88 are arranged. The mechanism 140 includes a plurality of fixedly spaced contact members 141 arranged beneath the horizontal lead of the pattern belt 127, and over which the belt passes. There is one contact member 141 for each solenoid and they are positioned in a transverse row in the plane of the rows of slots 128 in the belt. Fixedly mounted on a rail 142 of electrically conducting material which is electrically insulated from the loom frame and which is disposed above the horizontal lead of the belt, are flexible resilient feeler contacts 143 which normally rest upon the belt and which are in vertical alinement with the contact plates 141 respectively. The free ends of the feeler contacts 143 drop through the slots 128 in the pattern belt 127 for contacting engagement with the contact plates 141 as the predeterminedly arranged slots present themselves to the feeler contacts during the intermittent actuation of the pattern belt.

Mounted upon upright supports 144 which rise upwardly from the rails 29—29 at opposite ends of the loom frame, is a switch box 145, the same being disposed clear of but in the plane of the member A of the head motion. Mounted within the switch box 145 is a circuit closing switch 146 which is arranged in the circuit C. This switch includes an upper fixed contact member 147 and a lower pivoted or flexible contact member 148 which is normally disposed out of contacting engagement with the contact member 147. Slidably mounted in the bottom wall of the switch box 145 and depending therefrom, is a switch actuating pin 149 for actuating engagement with the contact member 148. The upper contacting portion of the pin is designated by 149—A, and is of dielectric material. The lower end of the pin 149 is provided with a roller 150 which is disposed in the path of a striker plate 151, which plate is fixedly secured to the top front of the frame 40 of the heddle lifting member A. By reference to Figure 5, it will be seen that the switch actuating pin 149 is engaged by the striker plate 151 on each upward movement of the member A, which closes the switch 146 and the circuit C which is set for operation by the feeler contacts 143 engaging their mating contact plates 141, will be closed and the solenoids 88 in the closed circuit will be energized, thus permitting those latch bars 74 which are under the influence of the energized solenoids, to be moved to unlatched position upon the next downward movement of the member A of the head motion. The circuit C receives its electric energy through electric supply conductors 152, the voltage of which is stepped down by a transformer 153. One side of the circuit C is grounded from the solenoid to the loom frame or other suitable ground as shown at 154 in Figure 11. The multiplicity of wires from the circuit setting switch mechanism 140 to the solenoids 88 pass through the cables 155 and the wire from the switch 146 to the mechanism 140 is designated 156.

Front and rear hoods 157 and 158 are pivoted at 159 to the uprights 144 and normally rest upon the end rails 29—29. The front hood 157 overlies the head motion of the loom and the rear hood 158 overlies the pattern control mechanism, and combined, they provide a top covering for preventing dust and fly settling on the loom, and also impart a neat and modern appearance to the loom as a whole. The outer sides of the hoods are provided with handles 160 to facilitate the raising and lowering of the hoods as and when it is necessary to reach parts of the loom disposed immediately therebeneath.

Having described the details of construction and the individual operations and functions of the several combined mechanisms of my improved loom, I shall now give a general outline of the cycle of operation of the loom as a whole.

Figure 3:
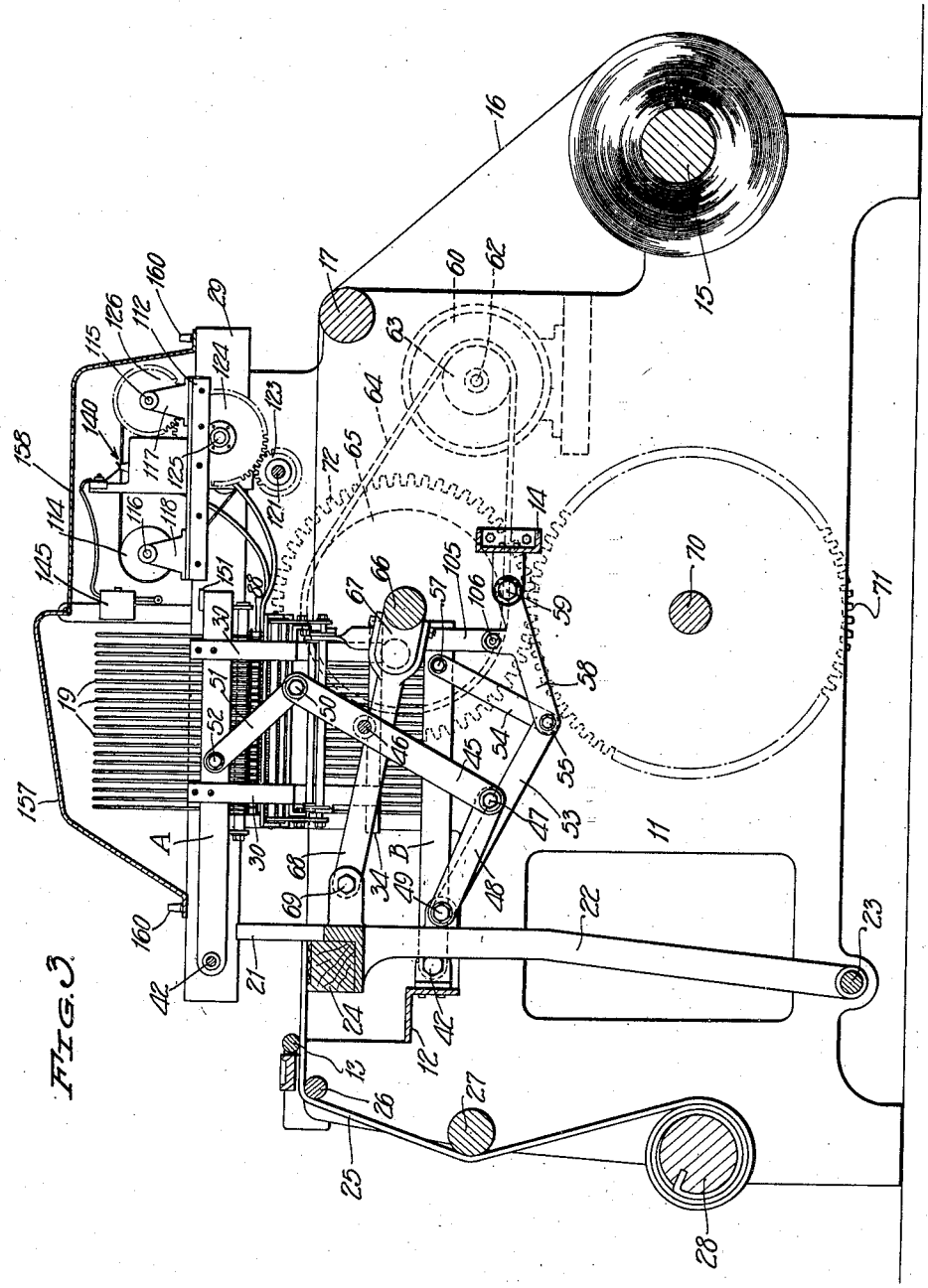
Figure 3 is a vertical transverse sectional view taken substantially on the line 3—3 of Figure 1.
Figure 5:
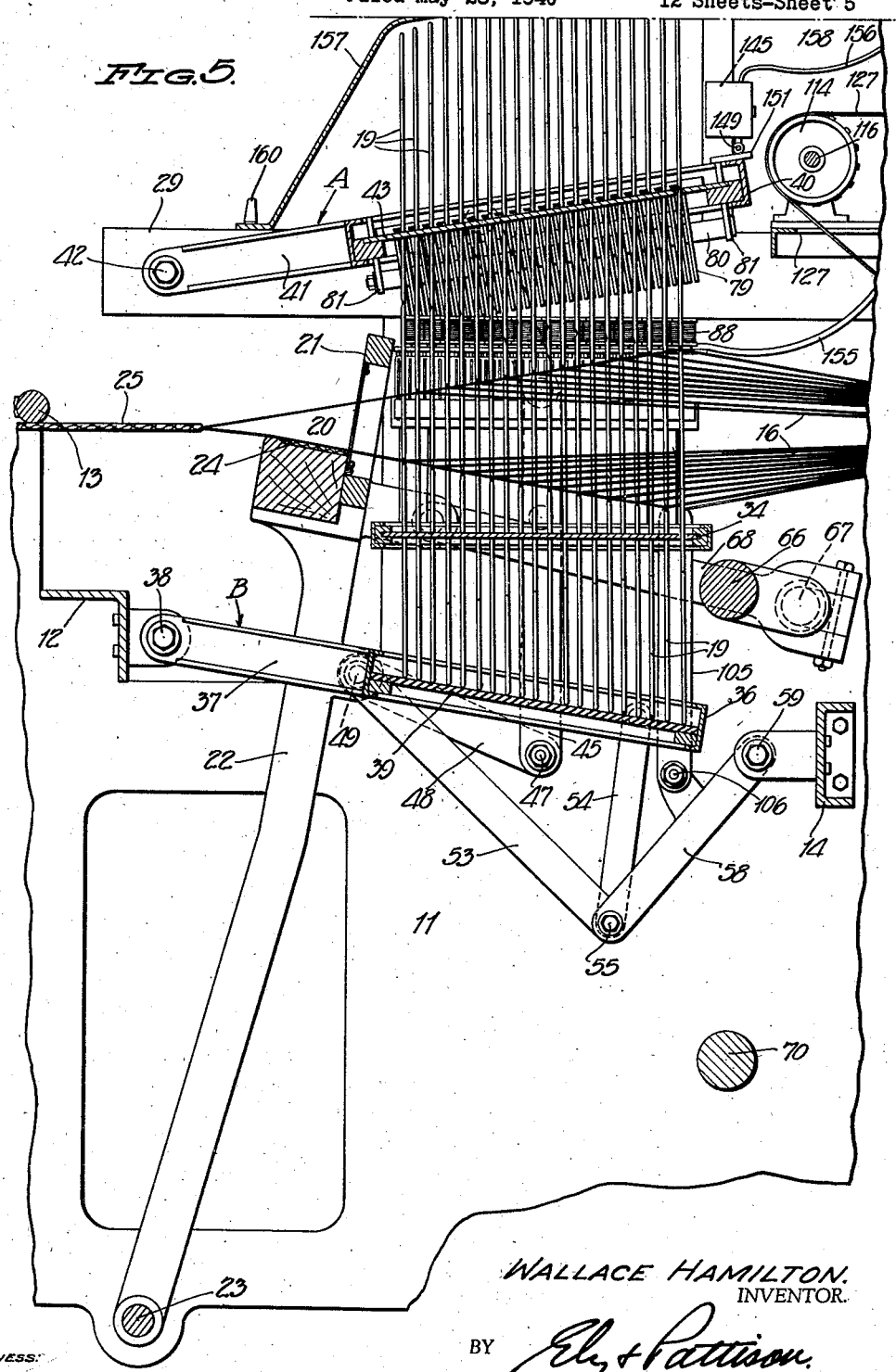
Figure 5 is an enlarged detail vertical sectional view on the line 5—5 of Figure 1, the head motion mechanism being illustrated in open position to position the heddles in shed forming position.

Assume that the loom is set up for operation with a pattern belt 127 in position upon the sprocket drums 113 and 114; and the warp threads 16 arranged side by side and threaded through the eyes of the respective heddles 19, and the head motion is in closed or horizontal position as best illustrated in Figures 3, 4, and 7, of the drawings. With the head motion in closed position, the heddle lifting member A and heddle lowering member B are horizontally disposed, and consequently the heddles 19 are at the same level for they are being supported by the flat panel 39 of the member B. The motor 63 is turned on and power therefrom is transmitted to the crank shaft 66. As the shaft 66 starts to turn, the lay sword 22 moves rearwardly, and this rearward movement of the lay sword causes the lever and link connections between the lay sword and the members A and B to simultaneously move the members A and B away from each other to an open position as illustrated in Figure 5. If none of the solenoids 88 have been energized on a previous cycle of operation, the dagger levers 79 are all in a vertical position, at which time the latch bars 73 are all disposed in heddle latching position and will therefore lock all the heddles 19 to the member A, whereupon all the heddles will move upwardly with the member A. Such a condition would naturally not produce a shed 20, but if on a previous cycle of operation, certain predetermined solenoids 88 were energized by reason of certain of the slots 128 in the belt 127 permitting the feeler contact members 143 to engage their related contact plates 141, the circuit will be closed as the striker plate 151 on the member A strikes the switch actuating pin 149, and thus closing the selectively set circuits and energizing the selected solenoids 88 therein, which enables the slide bars 83 which are under the influence of these energized solenoids to move outwardly to extended position by reason of the pusher springs 92. On the previous operation or cycle, the dagger levers 79 have been rocked by the cam surfaces 85 of the extended bars 83, and which rocking has caused the latch bars 73 connected thereto to be moved to an unlatched position. Therefore, instead of all of the heddles 19 moving upwardly with the member A, those heddles which are controlled by the latch bars 73 which are in unlatched position, are free of the member A and drop by gravity as the member B moves downwardly. By reference to Figure 5 wherein the members A and B of the head motion are in open position, the latched heddles 19 have moved upward with the member A, while the unlatched heddles have dropped with the member B and are resting on the flat panel 39 thereof, and which position of the head motion and heddle, forms the shed 20. While the head motion is in shed forming position, the shuttle (not shown) will lay the weft through the length of the shed, after which the member A moves down and the member B moves up, this movement being effected by the return or forward movement of the lay sword 22. Having described one complete cycle of operation of the head motion, it will be seen that if no change has been made in the heddle selection, the dagger levers will not be disturbed as they enter their respective notches in the bars 83, although during the interval of time that the member A is in raised position, the link and lever mechanism of the lower member B has actuated the lever 95 to cause the rod 93 to return the extended slide bars 83 to a retracted position, but unless these sections or branches of the circuit C controlling the solenoids 88 of these formerly extended slide bars have been deenergized by the pattern control mechanism, these bars will again slide outward to their extended position, and as the rod 93 moves outward, the dagger levers will enter the notches 84 and remain in their previously set positions. However, should a previously energized solenoid 88 be deenergized, that bar 83 controlled by said solenoid will become locked for the armature lock pin 89 will drop into its keeper notch 91, and when the related dagger lever descends, the cam surface 85 will right the lever and cause a previously unlatched latch bar 73 to return to latching position. Thus by selectively energizing and deenergizing the solenoids 88, the heddles may be unlocked and locked on successive cycles of operation, and by suitably spacing the slots 128 along the pattern belt 127, various weaves of cloth, and jacquard designs may be obtained in the finished cloth 25.

By referring to Figure 5 it will be clearly seen that by having the heddles 19 of the same length and with their eyes 18 at like distances from the ends of the heddles, that the warp ends forming the top of the shed 20 are parallel as they pass through the slots of the reed 21 and the same are substantially parallel to the raised angular position of the member A. The same is true of the warp ends 16 forming the bottom of the shed 20, for they assume a position substantially parallel to the lowered angular position of the member B. By maintaining the upper and lower warp ends in the positions just stated, a clear shed is provided which will enable the shuttle to pass therethrough unobstructed.

Figure 12:
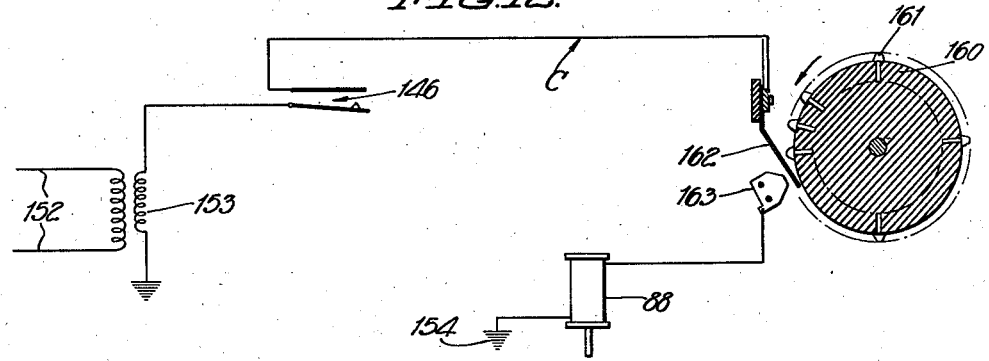
Figure 12 is a detail diagrammatic view of a modified form of electrical heddle selecting circuit in which a rotatable pattern cylinder is employed for determining the shedding of the warp threads.

In Figure 12 of the drawings I have illustrated a slightly modified form of circuit selector mechanism. Instead of a pattern belt 127 for selectively controlling the solenoids to be set for operation, I provide a driven rotatable pattern cylinder 160 which is intermittently turned in the same manner as the drum 113. The cylinder 160 is constructed of di-electric material having circumferential rows of alined removably mounted cam elements 161 on the periphery thereof. There will be a circumferential row of elements 161 for each branch of the circuit C, and each element successively engages a flexible spring contact member 162 and pushes it against the fixed companion contact member 163. The contact members 162 and 163 are the respective equivalents of the contact members 143 and 141 hereinbefore described, and are arranged in the branches of the circuit C. By suitably spacing the cam members 161 of each circumferential row, and by staggering the cam members of one circumferential row relative to those of other rows, various weaves and patterns may be woven into the cloth by the loom.

Figure 13:
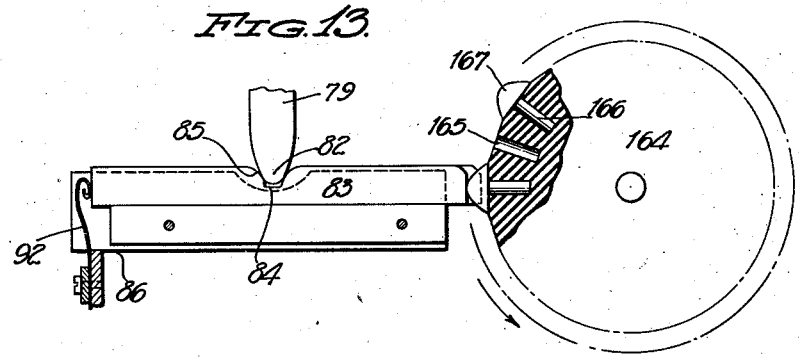
Figure 13 is a detail sectional elevational view of a still further modified form of heddle selecting means in which a pattern cylinder mechanism determines the shedding of the warp threads.

In Figure 13 of the drawings, I have illustrated a further modified form of pattern or weave control, in which the slide bars 83 are under the selective control of mechanical means rather than electrical means. Mounted to the right of the row of slide bars 83 is a pattern cylinder 164 having circumferential rows of sockets 165 therein which removably receive the stems 166 of cam shaped head members 167. There is a circumferential row of sockets 165 for each slide bar 163 and they are respectively arranged in alinement therewith. The cam members 167 may be predeterminedly positioned in certain of the slots according to the weave or pattern to be embodied in the woven cloth. The cylinder 164 is intermittently driven and as it turns, the cam members contact the outer ends of their respective slide bars 83, those slide bars which are not engaged by cam members being extended by the springs 92. Thus it will be seen that the slide bars may be pushed into a position to actuate the dagger levers 79 to effect a latching of the heddles or be extended to actuate the dagger levers to unlatching position. If desired, a conventional type of dobby chain might be used in the same manner as the pattern cylinder 164.

Figure 14:
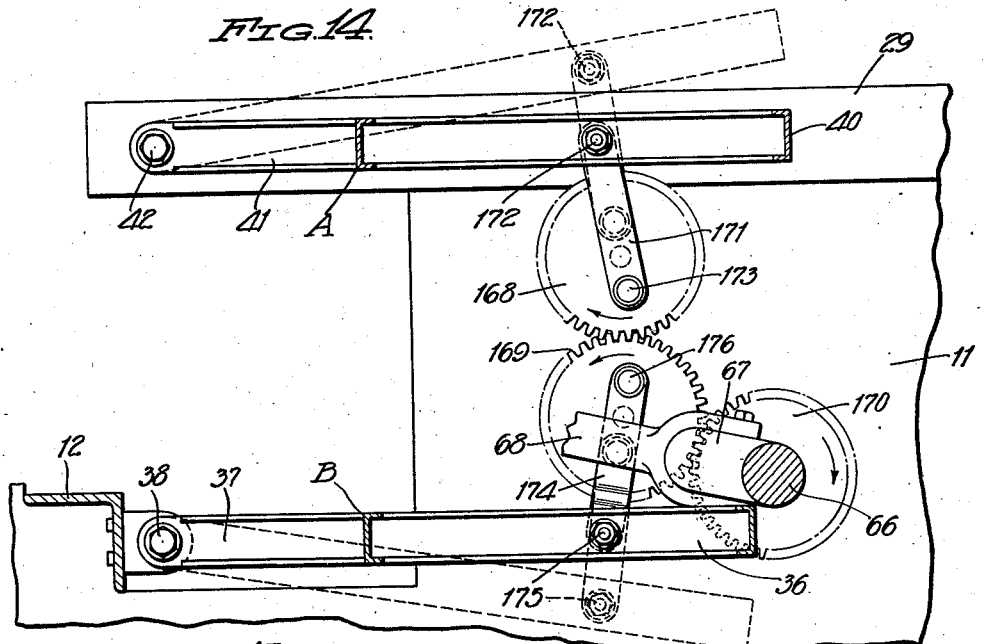
Figure 14 is a detail vertical transverse sectional view of a head motion actuating means, the parts being illustrated in closed position in full lines and in open shed forming position in dotted lines.

Figure 14 illustrates a modified form of head motion actuating means wherein a pair of meshing gears 168 and 169 are rotatably mounted at each end of the loom frame and are driven by bears 170 fixed to the driven crank shaft 66. Each gear 168 is connected to one end of the frame 40 of the upper heddle lifting member A by pivoting one end of a link 171 to the frame 40 as at 172 and by pivoting the other end of the link to an eccentric pin 173 on the gear 168. Each gear 169 is connected to one end of the frame 36 of the pivoted heddle base member B by pivoting one end of a link 174 to frame 36 as at 175 and by pivoting the other end of the link 174 to frame 36 as at 175 and by pivoting the other end of the link 174 to an eccentric pin 176 on the gear 169. In the drawings, the members A and B are illustrated in full lines in closed position, but it will be understood that as the shaft 66 turns, the gears 168 and 169 will be driven by the gear 170 and the links 171 and 174 will impart simultaneous operating movements to the members A and B to the position shown in dotted lines, after which the members A and B return to closed position to complete a cycle of operation of the head motion.

Figure 15:
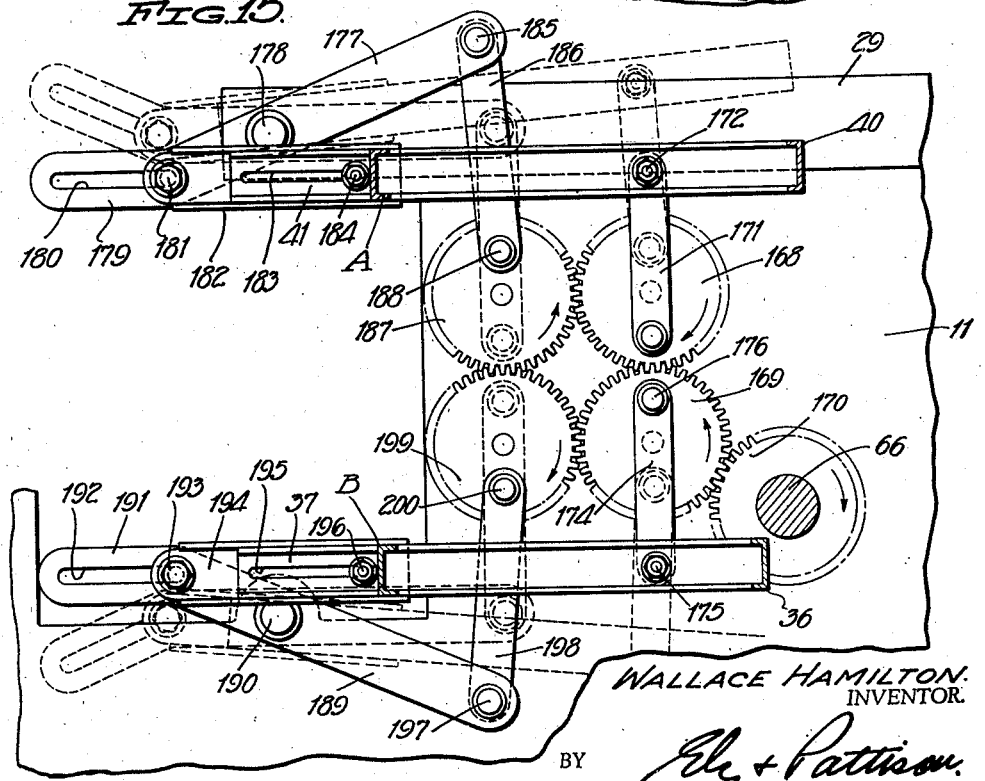
Figure 15 is a detail vertical transverse sectional view of a further modified form of head motion actuating means, the parts being illustrated in closed position in full lines and in open shed forming position in dotted lines.

In Figure 15 a further modified form of head motion is shown wherein the heddle lifting and lowering members are pivotally supported on "floating" pivots as distinguished from fixed pivots as hereinbefore shown and described. By this means, which is adjustable, the heddle lifting and lowering members A and B have vertical up and down movement as well as pivotal movement, and it is possible to regulate the angular relation that the members A and B are to assume when in open position, which regulation controls the height of the warp shed 20, and the angular relationship of the upper and lower warp ends which form the shed. To accomplish the above result, I provide at each end of the loom, a rock lever 177 pivoted intermediate its ends to an adjacent end rail 29 as at 178. The forward end of the lever 177 is provided with an angular extension or tail 179 having an elongated slot 180 therein. A pivot bolt 181 passes through the slot 180 and through a hole in the forward end of a channel arm member 182 which adjustably receives the extension portion 41 of the frame 40 of the member A. The extension portion 41 is provided with an elongated slot 183 and a clamping bolt 184 passes through the slot 183 and through a hole in the arm member 182. By loosening the bolt 184, the member A may be slid relative to the tail end of the lever 177, so as to change the pivot or fulcrum point of the member A relative to the length of the tail portion 179. The rear end of the lever 177 is pivoted at 185 to one end of a link 186, the other end of the link being pivoted eccentrically to a driven gear 187 as at 188. In this form of head motion I also employ an actuating mechanism similar to that set forth in Figure 14 and corresponding parts are identified by like reference characters. In order to impart rotation to the gear 187 for actuating the rocker arm 177, I constantly mesh the gear 187 with driven gear 168. An arrangement for "floating" the pivot of the lower member B is provided and which is similar to the construction just described for the member A, and includes a rock lever 189 pivoted intermediate its ends to an adjacent end frame 11 as at 190. The forward end of the lever 189 is provided with an angular extension or tail 191 having an elongated slot 192 therein. A pivot bolt 193 passes through the slot 192 and through a hole in the forward end of a channel arm member 194 which adjustably receives the extension portion 37 of the frame 36 of the member B. The extension portion 37 is provided with an elongated slot 195 and a clamping bolt 196 passes through the slot 195 and through a hole in the arm member 194. By loosening the bolt 196, the member B may be slid relative to the tail end of the lever 177 so as to change the pivot or fulcrum point of the member B relative to the length of the tail portion 191. The rear end of the lever 189 is pivoted at 197 to one end of a link 198, the other end of the link being pivoted eccentrically to a driven gear 199 as at 200. The gear 199 meshes both with the gear 187 and with the gear 169. In the drawings, the full lines illustrate the parts when the members A and B are in closed position, at which time they are horizontal and parallel. As the drive shaft 66 rotates, the gears, eccentric levers, and rock levers will simultaneously move the members A and B to the open position shown in dotted lines. In this dotted position, it will be noted that the pivots 181 and 193 have moved away from each other, and although the members A and B are disposed in forwardly converging relation, the angles are less than when the pivots are fixed. By adjusting the arm members 181 and 195, the pivots 181 and 193 may be so positioned along the angular tail portions 179 and 191 that the members A and B may assume different angular positions when in open position, or they may be set so that the members A and B assume parallel horizontal positions at all times.

In Figure 16 I have illustrated the manner in which the heddles 19 may be weighted and magnetized at their lower ends to effect a more rapid and positive drop thereto when they are lowered by the lower heddle actuating member B. Each heddle has a magnetized "lingoe" 201 attached to the lower end thereof. The "lingoe" 201 is flat and tubular and may be made of any magnetizable material. A flat key 202 passes through alined slots in the "lingoe" and heddle and has its ends bent flat against the opposite sides of the "lingoe" into two oppositely extending angular flanges 203—203. The panel 39 of the member B on which the heddles normally rest, is provided on its top surface with a plurality of parallel metal bars 205, one beneath each longitudinal row of alined heddles. The metal bars 205 are of a metal which is responsive to the magnetic action of the magnetized "lingoes" 201, and overlying the bars is a thickness of cushioning non-magnetic material 204. When the head motion is in closing position with all the "lingoes" 201 touching the cushioned insulated surface 204 of the heddle base member B, they will tend to stick to the member B, due to the magnetic attraction between the "lingoes" and the bars 205, but upon opening of the head motion, those heddles which are latched to the upper heddle lifting member A will be pulled away from the member B, and rise upwardly with the member A, the upward pull overcoming the magnetic pull. As the upper member A pivots upward, the longitudinal rows of heddles will successively break loose from the magnetic downward pull, so that the magnetic pull of all the heddles does not have to be overcome simultaneously by the power required for swinging the member A upwardly.

In Figure 18 there is shown a modified form of latch bar actuating mechanism which is similar to that illustrated in Figures 1 to 11, inclusive, but in which certain parts have been transposed. In this form, the twisted end of each latch bar 73 is fixedly attached to a slide bar 83' which is slidable in a rack adapted to be fixed to the frame of the upper member A of the head motion. The bar is provided with elongated slots 206 which receive stop pins 207 for limiting the back and forth sliding movement of the slide bar. The lower edge of the bar 82' is provided with a notch 84' having cam surfaces 85'. The dagger-like lever 79' is pivoted on a fixed rod 80' disposed beneath the slide bar 83' and has its nose end 82' extending upwardly. A spring 208 tends to pull the lever 79' in one direction to a position to effect latching of the latch bar 73 and as illustrated in full lines, while an electric solenoid 209 acts upon the lever to pull the same against the tension of the spring to latch bar unlatching position as illustrated in dotted lines. Thus when the solenoid is deenergized, the lever 79' is in a position that the nose 82' engages a cam surface 85' when the upper section A of the head motion closes and moves the latch bar to latching position, but when the solenoid is energized, the reverse action takes place, namely, the engagement of the nose end of the lever and cam surfaces of the notch causes the slide bar to move the latch bar 73 to unlatching position.

In Figure 19 a further modified form of latch bar actuating means is shown in which the nose end 82 of the dagger lever 79 engages the rounded nose end 210 of a rock lever 211, the latter being pivoted intermediate its ends on a fixed rod 212. A contractile spring 213 tends to normally hold the nose 210 of the lever in the dotted position so that when the nose end 82 of the lever 79 strikes it, the latch bar 73 will be moved to latching position. For moving the lever 211 to effect actuation of the lever 79 to move the latch bar 73 to unlatching position, I connect the sliding armature 214 of a solenoid 215 to the lower end of the lever. When the solenoid is energized it pulls the lever 211 against the tension of the spring. Thus by selectively energizing and deenergizing the solenoid 215, it is possible to position the nose end 210 of the lever at opposite sides of the plane of the nose end 82 of the lever 77 so that when the lever 79 moves down with the closing of the member A, the latch bar 73 may be turned to impart latching and unlatching movements to the latch bar.

In Figure 20 I have illustrated a sliding latch bar 73' which is under the direct influence of a solenoid 216, the sliding armature 217 of which is connected to one end of the latch bar 73'. The other end of the latch bar has one end of a contractile spring 218 connected thereto, the other end of the spring being anchored as at 219. When the solenoid 216 is deenergized, the spring 218 pulls the latch bar 73' to unlatching position, and when the solenoid is energized, the armature 217 pulls the latch bar against the action of the spring to latching position. The solenoid 216, latch bar 73', and spring anchorage of course, are all carried by the upper heddle lifting member A.

In Figures 21 and 22 I have illustrated an auxiliary heddle control mechanism which may be placed at both ends of the loom to effect the weaving of selvage edges to the cloth as it is woven under the control of the pattern control mechanism. Only one selvage weaving unit has been illustrated and it is capable of alternately lifting and lowering the selvage warp ends to produce the conventional successive over and under weave. The selvage weaving unit includes two batteries of spaced heddles X and Y. Each battery of heddles comprises a horizontal head bar 220 having spaced heddles 221 fixed thereto and depending therefrom, and which have eyes 222 through which pass the warp ends 223 which form the shed in the weaving of the selvage edge. The heddles 221 of the battery X are staggered with respect to the heddles of the battery Y. The bars 220 are provided midway of their ends with alined upstanding heddle extensions 224 which freely pass through slots 44 in the panel 43 of the upper heddle lifting member A. The lower ends of the heddles 221 rest upon the panel 39 of the lower member B. In order to form the under and over weave, it is necessary to alternately latch and unlatch the batteries of heddles X and Y to the heddle lifting panel 43 in timed relation to the up and down movements of the upper and lower heddle actuating members A and B. For this purpose, I provide a slidable latch plate 225 mounted in track rails 226 fixed to the underside of the panel 43 and extending crosswise of the batteries of the heddles X and Y. The plate 225 has a pair of alined elongated slots 227 therein through which the heddle extensions 224 freely pass. The heddle extensions 224 are provided with reversely arranged notches 228—228 and the slots 227 are of such length and so spaced that when the plate 225 is at the limit of its movement toward the right, the outer end of the left slot lockingly engages the notch 228 of the battery of heddles X, and this position of the plate is controlled by energizing a solenoid 229 which has its sliding armature 230 fixed to the right end of the latch plate. When the solenoid is deenergized, a contractile spring 231 effects unlatching of the plate from the battery of heddles X and causes the right end of the slot 227 to engage the notch 228 of the battery of heddles Y. Thus it will be apparent that by alternately energizing the solenoids 229, the batteries of heddles X and Y may be alternately latched to the heddle lifting member A, the battery of heddles not latched dropping down upon the downward movement of the member B.

While I have shown and described what I consider to be the most practical construction and design of my invention, I wish it to be understood that such modifications thereof as come within the scope of the appended claims may be resorted to if desired without departing from the spirit of the invention.

Having thus described the invention, what I claim as new and desire to secure by Letters Patent of the United States, is:

1. A shedding mechanism for looms comprising in combination, a pair of members arranged in spaced superposed relation, means for mounting said members for movement toward and away from each other, heddles normally resting upon the lower of the members and slidably extending through and above the upper of the members, actuating means for alternately moving said members toward and away from each other, and means carried by the upper of the members and engageable with the heddles for selectively connecting the heddles to the upper of the members for movement therewith.

2. A shedding mechanism for looms comprising in combination, a plurality of spaced heddles through which warp ends are adapted to pass, a support member on which the lower ends of said heddles normally rest, a lifting member disposed above the supporting member and having heddle slots therein through which the respective heddles pass, means for mounting said support member and said lifting member for simultaneous movement toward and away from each other, releasable latch means carried by the lifting member and engageable with the heddles by which said heddles may be individually connected to said lifting member for movement therewith, and means for selectively controlling the actuation of said latch means whereby certain of the heddles may be raised by the lifting member and the others caused to drop with the supporting member to form a shed.

3. A shedding mechanism for looms comprising in combination, a plurality of heddles having eyes through which warp ends are adapted to pass, a fixed guide member through which said heddles are freely slidable, a pivoted supporting member disposed below said guide member and on which the lower ends of said heddles normally rest, a pivoted lifting member disposed above said guide member and having slots therein through which the upper portions of said heddles slide, actuating means for simultaneously swinging said supporting member and said lifting member toward each other to shed closing position and away from each other to shed opening position, releasable latch means carried by the lifting member engageable with the heddles for connecting the individual heddles to the lifting member, and control means for selectively controlling the latching and unlatching of the latch means during the movement of the supporting and lifting members to shed closing position whereby predetermined heddles may be lifted with the lifting member and the others dropped by gravity upon subsequent movement of the members to shed opening position.

4. A shedding mechanism for looms comprising in combination, a pair of members arranged in superposed relation, means for mounting said members for simultaneous movement toward and away from each other, a fixed guide member mounted intermediate said pair of members, a plurality of heddles having eyes through which warp ends are adapted to pass, said heddles being normally supported by the lower of said pair of members and being freely slidable through openings in said guide member and in the upper of said pair of members, and releasable latch means carried by the upper of the members for selectively connecting the heddles thereto to move therewith.

5. A shedding mechanism for looms comprising in combination, an upper heddle lifting member, a lower heddle supporting member, means for mounting the members for movement toward and away from each other to shed closing and shed opening positions respectively, a fixed guide member interposed between the upper and lower members, rows of heddles freely slidable through openings provided in the guide member and in the heddle lifting member and being normally supported by said heddle supporting member, each heddle having a keeper notch, one or more latch members associated with each row of heddles and slidably mounted on said lifting member, there being a latch lug on said latch members for each heddle for latching engagement with the keeper notches of the heddles, actuating means for imparting simultaneous movement to the heddle lifting member and the heddle supporting member to move them to shed closing and shed opening positions, and means for selectively sliding said latch members to latching and unlatching positions upon movement of the heddle lifting and heddle supporting members to shed closing position.

6. A shedding mechanism for looms comprising in combination, an upper heddle lifting member, a lower heddle supporting member, means for mounting the members for movement toward and away from each other to shed closing and shed opening positions respectively, a fixed guide member interposed between the upper and lower members, rows of heddles freely slidable through openings provided in the guide member and in the heddle lifting member and being normally supported by said heddle supporting member, each heddle having a keeper notch, one or more latch members associated with each row of heddles and slidably mounted on said lifting member, there being a latch lug on said latch members for each heddle for latching engagement with the keeper notches of the heddles, actuating means for imparting simultaneous movement to the heddle lifting member and the heddle supporting member to move them to shed closing and shed opening positions, individual actuating means for imparting sliding movement to the latch members to latching and unlatching positions, spring actuated means tending to urge the individual actuating means to unlatching position, electromagnetic means for locking said individual actuating means in latching position against the action of the spring actuated means, and pattern controlled means for selectively actuating the electromagnetic means to release the spring actuated means and permit the same to actuate the individual actuating means to heddle latching position upon movement of the heddle lifting and supporting members to shed closing position.

7. A shedding mechanism for looms comprising in combination, a pivoted heddle supporting member, a pivoted heddle lifting member disposed above and in spaced relation to said pivoted supporting member having individual heddle slots therein, a fixed guide member having heddle slots therein, like heddles freely passing through the slots in said guide member and through the slots in said lifting member, the lower ends of said heddles normally resting upon said supporting member, each heddle having an eye intermediate its end through which a warp end is adapted to pass, means carried by the lifting member for selectively connecting the heddles to the heddle lifting member, and means for moving the heddle lifting member and the heddle supporting member to horizontal shed closing position with the eyes of the heddles disposed on the same horizontal plane, and for moving the heddle lifting member and the heddle supporting member to shed opening position in converging relation whereupon the eyes of the rows of heddles lifted by the heddle lifting member and the eyes of the heddles which drop with the heddle supporting member assume a like converging relation to produce uniform converging upper and lower warp ends at and when the shed is open.

8. A shedding mechanism for looms comprising a loom frame, a heddle supporting member pivoted to said frame, a heddle guide member fixedly mounted on said frame and disposed above said heddle supporting member, heddles freely slidable through openings in said guide member and having their lower ends resting upon said heddle supporting member, means for imparting an up and down pivotal movement to said supporting member, heddle lifting means, releasable means carried by the heddle lifting means for connecting the heddles to the heddle lifting means, and means for selectively controlling the actuation of said releasable means whereby certain heddles may be lifted clear of the heddle supporting member while the other heddles drop by gravity during the actuation of the lifting means and the down movement of the supporting member.

9. A shedding mechanism for looms comprising in combination a loom frame, a heddle supporting member pivoted to said frame, a heddle lifting member pivoted to said frame and disposed above and in spaced relation to the supporting member, a heddle guide fixedly mounted on said frame and disposed between the heddle supporting member and the heddle lifting member, the guide member and the heddle lifting member having alined heddle slots therein, heddles freely slidable through the alined heddle slots and having their lower ends engageable with the heddle supporting member, an oscillatable lay sword, means connecting said heddle lifting member and the heddle supporting member to said lay sword to impart simultaneous movement of the heddle lifting member and the heddle supporting member toward each other to shed closing position and away from each other to shed opening position upon oscillation of the lay sword, and latch means for selectively latching and unlatching the heddles to the heddle lifting member during the movement of the heddle lifting and supporting members to shed closing position.

10. A shedding mechanism for looms as set forth in claim 9, including pattern controlled means for controlling the selective actuation of the latch means, and means operable by the heddle lifting member when the same is in shed opening position for actuating the pattern controlled means.

11. A shedding mechanism for looms comprising in combination a loom frame, a heddle supporting member pivoted to said frame, a heddle lifting member pivoted to said frame and disposed above and in spaced relation to the supporting member, a heddle guide fixedly mounted on said frame and disposed between the heddle supporting member and the heddle lifting member, the guide member and the heddle lifting member having alined heddle slots therein, heddles freely slidable through the alined heddle slots and having their lower ends engageable with the heddle supporting member, an oscillatable lay sword, link means operatively connecting the heddle lifting member and the heddle supporting member to said lay sword to impart simultaneous movement of the heddle lifting member and the heddle supporting member toward each other to shed closing position and away from each other to shed opening position upon oscillation of the lay sword, and pattern controlled means for selectively connecting and disconnecting said heddles to said heddle lifting member on each shed opening and closing movement of the heddle lifting and supporting members.

12. A shedding mechanism for looms comprising in combination a loom frame, a heddle supporting member pivoted to said frame, a heddle lifting member pivoted to said frame and disposed above and in spaced relation to the supporting member, a heddle guide fixedly mounted on said frame and disposed between the heddle supporting member and the heddle lifting member, the guide member and the heddle lifting member having alined heddle slots therein, heddles freely slidable through the alined heddle slots and having their lower ends engageable with the heddle supporting member, a drive shaft, gear actuated means driven by said drive shaft for moving the heddle lifting and heddle supporting members away from each other to shed opening position and toward each other to shed closing position upon each revolution of the drive shaft, and pattern controlled means for selectively connecting and disconnecting said heddles to said heddle lifting member on each shed opening and closing movement of the heddle lifting and supporting member.

13. In a loom, a heddle control mechanism therefor comprising in combination, a heddle lifting member, means for raising and lowering said heddle lifting member, rows of heddles slidable through individual openings provided in said heddle lifting member, each heddle having a keeper notch in one of the sides thereof, the keeper notches in the heddles of a row facing in the same direction, latch means for each row of heddles including a plurality of latch bars slidably mounted on said lifting member and arranged in superposed relation adjacent their related row of heddles at that side thereof in which the keeper notches are provided, equi-distantly spaced latch lugs on said latch bars for latching engagement with the keeper notches of the respective heddles, the latch lugs on the bars being arranged in staggered relation and combined they provide a latch lug for each heddle, the keeper notches being disposed in the same plane as the latch lugs when the heddle lifting member is in lowered position, and means for selectively sliding the latch bars when the heddle lifting member is moved to lowered position for effecting a latching and unlatching of the latch lugs with the keeper notches whereby selected groups of heddles may be connected to the heddle lifting member for upward movement therewith.

14. In a loom, a heddle lifting member, rows of heddles slidable through said heddle lifting member, the heddles of the rows being staggered so as to be disposed out of transverse alinement, each row of heddles being controlled by a series of latch bars, means for slidably mounting the latch bars of each series in superposed relation upon the lifting member, each latch bar adapted to control a group of heddles of a row and combined they control all the heddles of a row, interengaging latching elements between the latch bars and the heddles which they control for connecting the heddles to the lifting member for movement therewith, and actuating means for individually sliding the latch bars to effect engagement of the latching elements and disengagement thereof.

15. In a loom, a heddle lifting member, means for alternately raising said heddle lifting member to shed opening position and lowering the same to shed closing position, one or more rows of heddles freely slidable through the heddle lifting member, a series of latch bars for each row of heddles, means for slidably mounting the latch bars in superposed relation upon said heddle lifting member, each latch bar adapted to control a predetermined group of heddles and the latch bars combined acting to control all the heddles of a row, interengaging latching elements between the latch bars and the particular heddles which they control for connecting the heddles to the lifting member, individual actuating means for each latch bar for sliding the same in one direction to effect a connection between the latching elements and in an opposite direction to effect a disconnection of said latching elements, and pattern controlled means for selectively operating the individual actuating means when the heddle lifting member moves downwardly to shed closing position.

16. In a loom, a heddle lifting member, means for alternately raising and lowering said lifting member to shed opening position and shed closing position respectively, a plurality of rows of heddles freely slidable through rows of individual guide slots provided in said heddle lifting member, the heddles of the plurality of rows being staggered relative to each other so that no two heddles are disposed in transverse alinement, latch means carried by said heddle lifting member for individually latching predetermined groups of heddles to the lifting member, means operable upon movement of the heddle lifting member to shed closing position for actuating the latch means to latching and unlatching positions, and pattern controlled means for selectively setting the last named means to latching and unlatching positions and being operable upon movement of the heddle lifting member to shed opening position.

17. In a loom, a panel-like heddle lifting member, means for alternately raising and lowering said heddle lifting member to shed opening position and shed closing position respectively, said panel-like heddle lifting member having a plurality of parallel rows of heddle slots therein, the slots of each row being staggered relative to the slots of the other rows so that all of the slots are out of transverse alinement, a heddle freely passing through each heddle slot to provide rows of heddles, a heddle rest member on which the lower ends of the heddles rest, latch means carried by said heddle lifting member for latching predetermined groups of heddles of each row of heddles to the lifting member, means operable upon movement of the heddle lifting member to shed closing position adapted to be set for actuating the latch means to latching and unlatching positions, and pattern controlled means for selectively setting the last named means to latching and unlatching positions and operable upon movement of the heddle lifting member to shed opening position.

18. In a loom, a heddle control mechanism including a heddle lifting member having a row of heddle slots therein, a heddle freely slidable through each heddle slot to provide a row of heddles, a keeper notch provided in each heddle, a plurality of latch bars arranged one upon the other, each latch bar having spaced latching lugs which are engageable with the notches of a predetermined group of heddles, the latch lugs of the plurality of latch bars adapted to respectively engage the notches of all of the heddles, means for slidably mounting said latch bars upon the heddle lifting member with their latch lugs in confronting relation with respect to the notches in said heddles, and means operatively connected to one end of each latch bar for imparting back and forth sliding movement thereto to respectively cause the latch lugs thereof to engage the notches of a group of heddles and for effecting disengagement thereof.

19. A heddle control mechanism for looms comprising in combination, a heddle lifting member, a heddle supporting member disposed beneath said heddle lifting member, heddles having their lower ends resting upon said heddle supporting member and their upper ends extending through heddle slots in said heddle lifting member, means for alternately moving said heddle lifting member and said heddle supporting member toward and away from each other, means for selectively latching said heddles to said heddle lifting member for upward movement therewith, the unlocked heddles remaining supported upon said heddle supporting member for downward movement therewith, and magnetic means between the lower ends of said heddles and said supporting member to cause the heddles to adhere to the supporting member, the pull of the magnetic means being less than the pull of the upward movement of the heddle lifting member to enable the selected latch heddles to pull away from the heddle supporting member during upward lifting movement of the heddle lifting member.

20. A heddle control mechanism for looms as set forth in claim 19, in which the magnetic means comprises magnetized elements fixedly mounted on the heddle supporting member in alinement with the lower ends of the heddles, and elements carried by the lower ends of the heddles and being of a material responsive to the magnetic force of the magnetic elements.

21. In a loom, a heddle control mechanism for the weaving of a selvage edge upon the fabric being woven by the loom including a heddle lifting member having openings therein, a heddle supporting member disposed beneath said heddle lifting member, means for alternately moving the heddle lifting member and the heddle supporting member toward and away from each other, two spaced parallel rows of selvage heddles having their lower ends resting upon the supporting member and their upper ends extending through the openings in the lifting member, means rigidly connecting the upper ends of the heddles of each row together so that each row of heddles may move as a unit, and means for alternately latching the heddle units to the heddle lifting member during each two successive movements of the heddle lifting member and heddle supporting member toward and away from each other.

22. In a loom, a heddle lifting and lowering member having slots therein, heddles slidable through said slots, each of the heddles having an eye therein for the passage of a warp end, a notch provided in each heddle, the side walls of each notch being cam curved, and a latch member slidably mounted on said lifting and lowering member for engagement with the notches of the respective heddles, the cam curved walls of the notches serving to prevent accidental interlocking engagement of the notches with the latch members and walls of the slots when the latch members are in unlatching position and during the actuation of the heddle lifting and lowering member.

23. In a loom, a heddle control mechanism for the weaving of a selvage edge upon the fabric being woven by the loom including a heddle lifting member, a heddle supporting member disposed beneath the heddle lifting member, means for alternately moving the heddle lifting member and the heddle supporting member toward and away from each other, two spaced parallel rows of selvage heddles having their lower ends resting upon the supporting member, means rigidly connecting the upper ends of the heddles of each row together so that each row of heddles may be moved as a unit, means for alternately latching the heddle units to the heddle lifting member during each two successive movements of the heddle lifting member and heddle supporting member toward and away from each other, said means for alternately latching and unlatching the heddle units to the heddle lifting member comprising a latch bar extending upwardly from each heddle unit which freely passes through a slot in the heddle lifting member, a notch provided in each latch bar, the notches of the latch bars facing in opposite directions, a latch plate slidably mounted on the heddle lifting member having slots therein for the passage of the latch bars, spring means acting upon said latch plates to normally cause the end of one of the slots therein to engage the notch of one of the latch bars while the other latch bar is free, and an electrically operated means for actuating the latch plate against the action of said spring means to cause a reverse latching and unlatching of the latch bars relative to the end walls of the slots in said latch plate.

24. A shedding mechanism for looms comprising in combination, an upper heddle lifting member, a lower heddle supporting member, means for mounting the members for movement toward and away from each other to shed closing and shed opening positions respectively, rows of heddles freely slidable through openings provided in the heddle lifting member and being normally supported by said heddle supporting member, each heddle having a latch engaging element, one or more latch members associated with each row of heddles and slidably mounted on said lifting member, there being a latch element on said latch members for each heddle for latching engagement with the latch engaging elements of the heddles, actuating means for imparting simultaneous movement to the heddle lifting member and the heddle supporting member to move them to shed closing and shed opening positions, and means for selectively sliding said latch members to latching and unlaching positions upon movement of the heddle lifting and heddle supporting members to shed closing position.

25. A shedding mechanism for looms comprising in combination, an upper heddle lifting member, a lower heddle supporting member, means for mounting the members for movement toward and away from each other to shed closing and shed opening positions respectively, rows of heddles freely slidable through openings provided in the heddle lifting member and being normally supported by said heddle supporting member, one or more latch members associated with each row of heddles and slidably mounted on said lifting member, interengaging latch elements on the latch members and heddles, actuating means for imparting simultaneous movement to the heddle lifting member and the heddle supporting member to move them to shed closing and shed opening positions, individual actuating means for imparting sliding movement to the latch members to latching and unlatching positions, spring actuated means tending to urge the individual actuating means to unlatching position, means for locking said individual actuating means in latching position against the action of the spring actuated means, and pattern control means for selectively actuating the locking means to release the spring actuated means and permit the same to actuate the individual actuating means to heddle latching position upon movement of the heddle lifting and supporting members to shed closing position.

26. A shedding mechanism for looms comprising in combination, a loom frame, a heddle supporting member mounted for up and down movement in said frame, a heddle lifting member mounted for up and down movement in said frame and disposed above and in spaced relation to the supporting member, the heddle lifting member having heddle slots therein, heddles freely slidable through the heddle slots and having their lower ends resting upon the heddle supporting member, an oscillating lay sword, means connecting said heddle lifting member and said heddle supporting member to said lay sword to impart simultaneous movement of the heddle lifting member and the heddle supporting member toward each other to shed closing position and away from each other to shed opening position upon oscillation of the lay sword, and means for selectively latching and unlatching the heddles to the heddle lifting member during the movement of the heddle lifting and supporting members to shed closing position.

27. In a loom, a heddle lifting member, rows of heddles slidable through said heddle lifting member, each row of heddles being controlled by a series of latch bars, means for slidably mounting the latch bars of each series in superposed relation upon the lifting member, each latch bar controlling a group of heddles of a row and combined controlling all the heddles of a row, interengaging latching elements between the latch bars and the heddles which they control for connecting the heddles to the lifting member for movement therewith, and actuating means for individually sliding the latch bars to effect engagement of the latching elements and disengagement thereof.

WALLACE HAMILTON.